United States Patent
Ryali et al.

(10) Patent No.: US 12,444,188 B2
(45) Date of Patent: Oct. 14, 2025

(54) AUTOMATED DETECTION AND RECOMMENDATIONS RELATED TO ACCESSIBILITY FEATURE COMPLIANCE IN PHYSICAL ENVIRONMENTS

(71) Applicants: Sanjana Ryali, San Jose, CA (US); Sivani Ryali, San Jose, CA (US)

(72) Inventors: Sanjana Ryali, San Jose, CA (US); Sivani Ryali, San Jose, CA (US)

( * ) Notice: Subject to any disclaimer, the term of this patent is extended or adjusted under 35 U.S.C. 154(b) by 493 days.

(21) Appl. No.: 17/870,632

(22) Filed: Jul. 21, 2022

(65) Prior Publication Data

US 2024/0029428 A1    Jan. 25, 2024

(51) Int. Cl.
| | |
|---|---|
| *G06V 20/10* | (2022.01) |
| *G06V 10/26* | (2022.01) |
| *G06V 10/774* | (2022.01) |
| *G06V 10/776* | (2022.01) |
| *G06V 10/94* | (2022.01) |

(52) U.S. Cl.
CPC ............ *G06V 20/176* (2022.01); *G06V 10/26* (2022.01); *G06V 10/774* (2022.01); *G06V 10/776* (2022.01); *G06V 10/945* (2022.01)

(58) Field of Classification Search
CPC .. G06V 20/176; G06V 20/586; G06V 10/774; G06V 10/776; G06V 10/26; G06V 10/945; G06V 20/70; G06V 20/10
See application file for complete search history.

(56) References Cited

U.S. PATENT DOCUMENTS

| | | | |
|---|---|---|---|
| 11,262,979 B2* | 3/2022 | Deshmukh | G06N 20/00 |
| 2008/0189166 A1* | 8/2008 | Brooks | G06Q 50/265 |
| | | | 705/325 |
| 2021/0049780 A1* | 2/2021 | Westmacot | G01C 21/3602 |
| 2022/0327264 A1* | 10/2022 | Murphy | G06N 3/08 |
| 2023/0215291 A1* | 7/2023 | Kimmel | G06Q 50/163 |

\* cited by examiner

*Primary Examiner* — Andrew M Moyer
*Assistant Examiner* — Ahmed A Nasher
(74) *Attorney, Agent, or Firm* — Fish & Richardson P.C.

(57) ABSTRACT

Methods, systems, and apparatus, including computer programs encoded on a computer storage medium, for determining whether a physical environment includes structural features that comply with accessibility guidelines. In one example method, input data, which can include image data representing an image of a particular portion of a physical environment, can be received from a client device. The image data can be input to a trained accessibility feature detection model, which can be trained to detect a particular structural feature and determine whether it meets a first accessibility guideline for the particular structural feature. The data output by the model can be used to determine whether the image data includes the particular structural feature that meets the first accessibility guideline, and based on this determination, an accessibility report can be generated and provided for display on the client device.

21 Claims, 7 Drawing Sheets

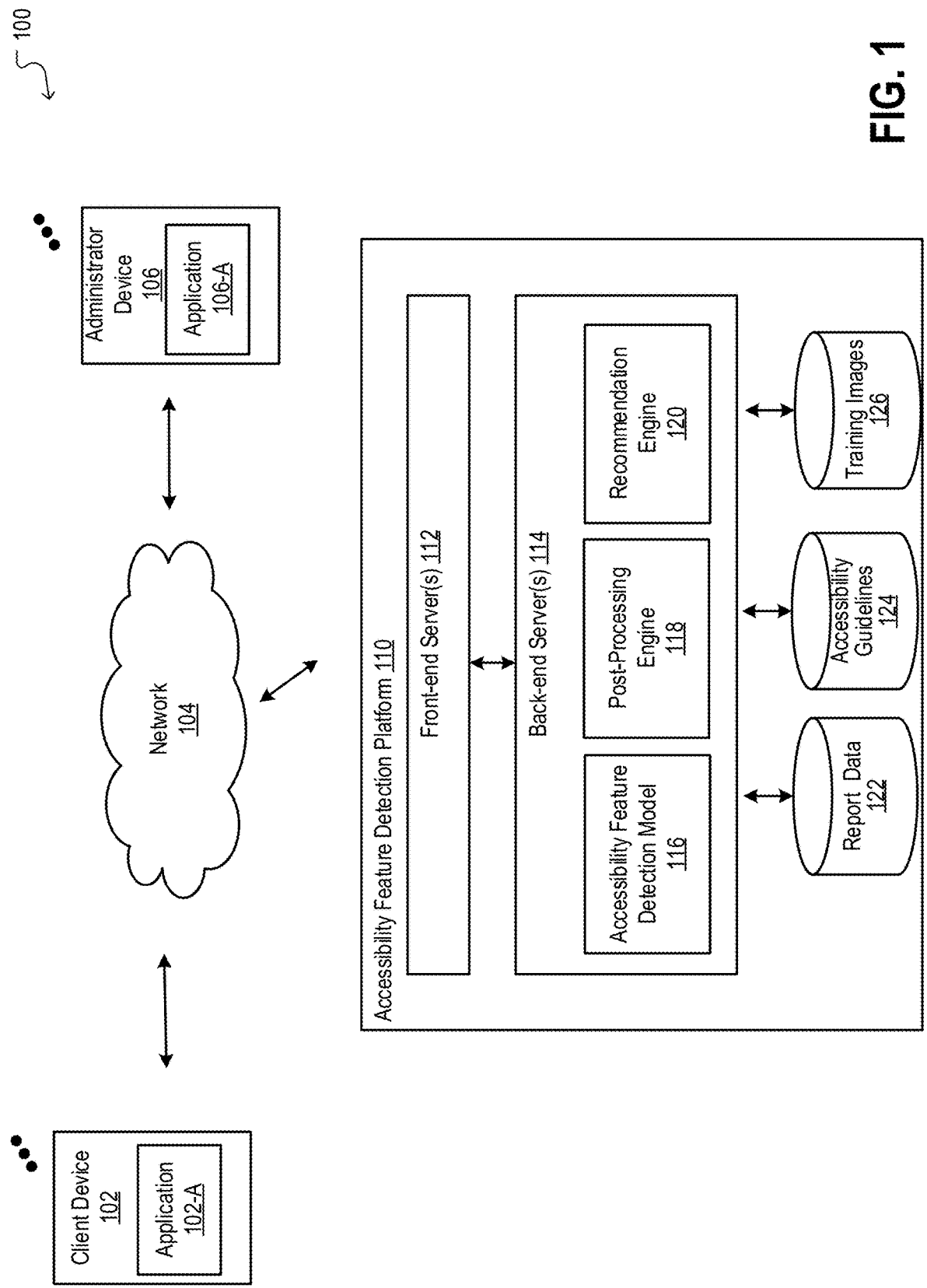

FIG. 2B

AUTOMATED DETECTION AND RECOMMENDATIONS RELATED TO ACCESSIBILITY FEATURE COMPLIANCE IN PHYSICAL ENVIRONMENTS

TECHNICAL FIELD

This specification generally relates to data processing and in particular, to determining whether a particular physical environment (e.g., an office building, school, park, hotel, etc.) includes structural features that comply with accessibility guidelines (e.g., the American Disability Act's (ADA) accessibility guidelines), and providing specific recommendations regarding structural improvements or additions that can be made to the physical environment to achieve compliance with the accessibility guidelines (and/or to improve the physical environment's accessibility beyond applicable accessibility guidelines).

BACKGROUND

Information regarding whether a building, public space, or another physical environment includes accessibility features (e.g., handicap parking, handicap ramps, accessible door handles, wheelchair accessible space in rooms) are essential for people with disabilities. For example, disabled individuals often use such accessibility information to decide whether they can access a particular physical environment.

However, such accessibility information may either not be readily available for different physical environments or is often incomplete or inaccurate. For example, certain conventional solutions that provide accessibility information for physical environments may rely on crowdsourced information about the physical environments' accessibility features, which can be inaccurate and/or incomplete. Such solutions may also may provide accessibility information for certain popular physical environments, while failing to report such information for other physical environments. As another example, operators of physical environments may attempt to self-report the accessibility features of those physical environments; however, such accessibility information can also be incomplete and may not provide holistic accessibility feature information for the particular physical environment.

Even when accessibility feature information for physical environments is available, such information may not indicate whether the accessibility features are compliant with accessibility guidelines. For example, although a building may provide a wheelchair accessible ramp, that ramp may not comply with ADA's accessibility guidelines for such ramps. As a result, a wheelchair user may inadvertently rely on such accessibility information to attempt to access the building only to find out that the ramp in not wide enough to accommodate the user's wheelchair.

SUMMARY

The techniques described in this specification enable accurate and holistic identification of accessibility compliance information of structural features in physical environments, and where lack of compliance is identified, the techniques described herein enable provision of specific and actionable recommendations regarding structural improvements, modifications, or additions that can be made to the physical environment to achieve compliance with accessibility guidelines (and/or to improve the physical environment's accessibility beyond applicable accessibility guidelines). As used in this specification, accessibility guidelines can include, but is not limited to, guidelines for accessibility in a particular physical environment, as specified by a standard body (e.g., the body responsible for generating the American Disability Act (ADA) guidelines). Indeed, accessibility guidelines, as used herein, can include guidelines relating to accessibility that are in addition to or in place of known accessibility guidelines defined by standard-setting bodies (e.g., the standards body responsible for providing accessibility guidelines per the American with Disabilities Act, or by governmental agencies defining the same or similar accessibility guidelines, e.g., in the form of accessibility-related building codes).

In general, one innovative aspect of the subject matter described in this specification can be embodied in methods including the operations of receiving, from a client device, input data including image data representing an image of a particular portion of a physical environment; inputting, to an accessibility feature detection model, the image data, wherein the accessibility feature detection model is trained to detect a particular structural feature and determine whether the particular structural feature meets a first accessibility guideline for the particular structural feature, and wherein the accessibility feature detection model is trained using a set of labeled training images; determining, using data output by the accessibility feature detection model, whether the image data includes the particular structural feature that meets the first accessibility guideline; generating an accessibility report based on the determination of whether the image data includes the particular structural feature that meets the first accessibility guideline; and providing the accessibility report for display on the client device. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, methods can include determining, using an image processing algorithm, data for an attribute relating to the particular structural feature detected in the image data; and determining, based on the data for the attribute, whether the particular structural feature meets a second accessibility guideline for the particular structural feature.

In some implementations, determining whether the particular structural feature meets the second accessibility guideline for the particular structural feature, can include identifying an accessibility threshold corresponding to the second accessibility guideline. When the data for the attribute related to the particular structural feature meets the accessibility threshold, method can include confirming that the particular structural feature meets the second accessibility guideline for the particular structural feature; and when the data for the attribute related to the particular structural feature does not meet the accessibility threshold, methods can include determining that the particular structural feature does not meet the second accessibility guideline for the particular structural feature.

In some implementations, methods can include receiving, from the client device, a request to generate the accessibility report for the physical environment; and receiving data for an attribute corresponding to one or more structural features corresponding to the physical environment.

In some implementations, the one or more structural features can include the particular structural feature.

In some implementations, receiving data for one or more structural features corresponding to the physical environment can include receiving, from the client device, the data for one or more structural features for the physical environment; or receiving, from third party data source, the data for one or more structural features for the physical environment.

In some implementations, generating the accessibility report can include generating the accessibility report using (1) data indicating that the image data includes the particular structural feature, (2) data indicating whether the particular structural feature meets the first accessibility guideline and the second accessibility guideline, and (3) recommendation data descriptive of an adjustment or an addition required to the particular structural feature, for compliance with accessibility guidelines for the particular structural feature.

In some implementations, methods can include training the accessibility feature detection model.

In some implementations, training the accessibility feature detection model can include obtaining a dataset including a plurality of training images that identify the particular structural feature using a bounding box and a plurality of labels corresponding to the training images, where each label corresponds to a respective training image indicates whether the identified particular structural feature in the training image meets the first accessibility guideline; splitting the dataset into a training dataset and a test dataset; and training the accessibility feature detection model using the training dataset and the testing dataset.

In some implementations, training the accessibility feature detection model using the training dataset and the testing dataset can include training, using the training dataset, the accessibility feature detection model to minimize an objective function; and after training the accessibility feature detection model using the training dataset, evaluating model performance using the test dataset.

In some implementations, evaluating the model performance using the test dataset can include obtaining, from the accessibility feature detection model and using images in the test dataset, model predictions corresponding to the images in the test dataset; computing a model performance metric based on the model predictions obtained for the test dataset; and determining whether the model performance metric meets a pre-determined performance threshold for the accessibility feature detection model.

Particular embodiments of the subject matter described in this specification can be implemented to realize one or more of the following advantages.

The techniques described in this specification provide automated, artificial intelligence-based solutions that can be used to accurately identify structural features of a particular physical environment and determine whether those structural features are compliant with accessibility guidelines. In some implementations, the techniques described herein utilize actual images and additional structural information (e.g., number of parking spaces, number of rooms, number of stories in a building, etc.) of the physical environment to generate an accurate and holistic evaluation of a physical environment's accessibility features relative to conventional solutions, which as noted above, often provide inconsistent and inaccurate accessibility information, and may also fail to provide any indication of compliance of structural features with accepted accessibility guidelines (e.g., ADA's accessibility guidelines).

Moreover, the techniques described herein also enable provision of specific recommendations that identify the types of structural modifications, improvements, or additions needed to a physical environment to achieve compliance with accessibility guidelines. Thus, unlike conventional solutions that may provide statistics or general information regarding the types of accessibility features that are available at a particular physical environment, the techniques described herein generate and provide an operator or a user, specific information and recommendations regarding the non-compliant (or missing) accessibility features and the types of structural modifications or additions that are needed to achieve compliance with accessibility guidelines.

Additionally, the techniques described herein determine accessibility feature compliance in a resource and computationally efficient manner. Unlike conventional supervised machine learning solutions that utilize a significant amount of data in the form of training images for training the underlying models, in some implementations, the techniques described herein utilize a model pre-trained for object detection and scene classification (e.g., an Amazon Rekognition model), which can be customized with custom labels relating to accessibility features. When so customized, the model training and parameter tuning as part of the model training can be performed using a relatively smaller training dataset (e.g., a training dataset of hundreds of images compared with the thousands of images that are normally required for model training). This in turn results in a shorter time and reduced resource utilization for model training relative to conventional model training techniques. Similar resource efficiencies can be obtained by using transfer learning techniques applied to established models (such as EfficientNet, ResNet, ResNext, or other models, such as those based on the Inception architecture, etc.)

The techniques described herein can also achieve computational resource efficiencies by providing a single model that integrates accessibility feature detection and compliance across multiple accessibility features, as opposed to having a separate model trained for detection and accessibility compliance relating to a particular accessibility feature. As one skilled in the art will appreciate, each separate model can consume more computational resources (relative to a single integrated model), and in combination, the computational processing needs for deploying the separate models are higher relative to that of a single, integrated model. Notably, the computational needs for training separate models and an integrated model are similar. Thus, during training, an integrated model has similar performance and resource utilization as multiple separate models, and when deployed, the single integrated model has relatively better computational performance than multiple, separate models. As such, a single integrated model can provide similar accuracy and predictive performance as separately trained models, while still achieving greater computational performance and resource efficiencies, relative to those separately trained models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram of an example environment in which structural features for a particular physical environment are detected and evaluated for compliance with accessibility guidelines.

FIG. 2B depict example interfaces of the accessibility survey data input and the accessibility report output by the accessibility feature detection platform of FIG. 1.

DETAILED DESCRIPTION

Figure 2A:
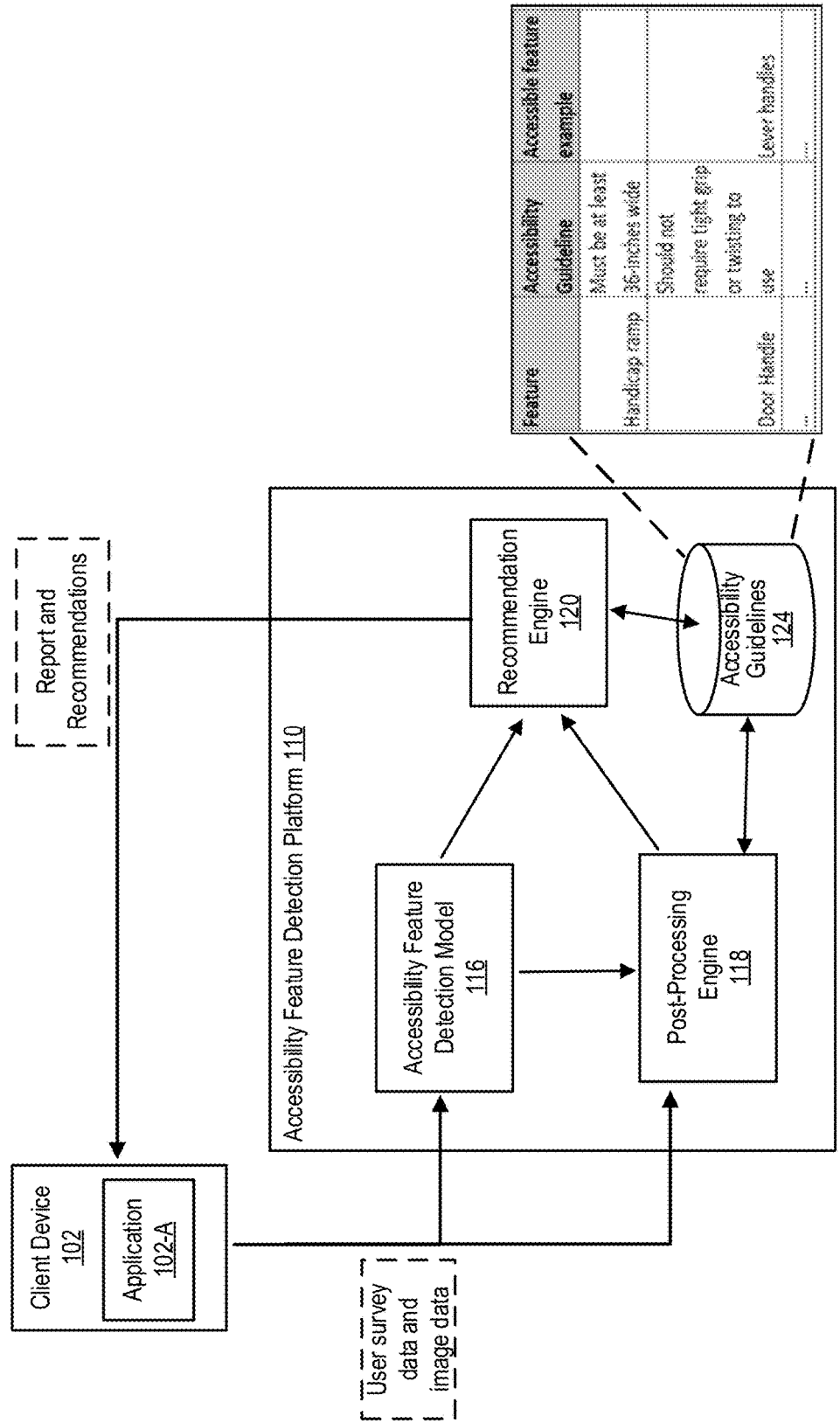
FIG. 2A is a block diagram that depicts a subset of the environment shown in FIG. 1, which is leveraged in detecting structural features for a particular physical environment and determining whether those features meet accessibility guidelines.

This specification discloses methods, systems, apparatus, and computer readable media for determining whether a particular physical environment (e.g., an office building, school, park, hotel, etc.) includes structural features that comply with accessibility guidelines (e.g., the American Disability Act's (ADA) specified accessibility guidelines), and providing specific recommendations regarding structural improvements, modifications, or additions that can made to the physical environment to achieve compliance with the accessibility guidelines.

FIG. 1 is a block diagram of an example environment 100 in which attributes of a physical environment (e.g., buildings, schools, etc.) are processed to determine whether the particular physical environment includes accessibility features that comply with accessibility guidelines.

The example environment 100 includes a network 104. The network 104 can include a local area network (LAN), a wide area network (WAN), the Internet, or a combination thereof. The network 104 can also comprise any type of wired and/or wireless network, satellite networks, cable networks, Wi-Fi networks, mobile communications networks (e.g., 3G, 4G, and so forth) or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof. The network 104 connects one or more client devices 102 and one or more administrator devices 106 to an accessibility feature detection platform 110.

Both the client device 102 and the administrator device 106 are types of electronic devices that are capable of requesting and receiving resources over the network 104. Examples of client devices 102 and administrator devices 106 include personal computers, mobile communication devices, and other devices that can send and receive data over the network 104. They devices typically include an application (e.g., application 102-A, application 106-A), such as a web browser, that facilitates the sending and receiving of data over the network 104, but native applications executed by the client device 102 and the administrator device 106 can also facilitate the sending and receiving of data over the network 104.

The accessibility feature detection platform 110 can be a computing platform that is operated and maintained by an administrator (e.g., an administrator user who communicates with the accessibility feature detection platform 110 using the administrator device 106). The accessibility feature detection platform 110 enables processing data relating to a physical environment to determine whether the particular physical environment includes accessibility features that comply with accessibility guidelines. The components of the accessibility feature detection platform 110 are summarized below, and their operation and structural details are described below with references to FIGS. 2A-2B and FIGS. 3-4.

As depicted in the block diagram of FIG. 1, the accessibility feature detection platform 110 is depicted as a single block with various sub-blocks. While the accessibility feature detection platform 110 could be a single device or a single set of devices, this specification contemplates that the accessibility feature detection platform 110 could also be a group of devices, or even multiple different systems that communicate with each other to enable the determination regarding whether a particular physical environment includes accessibility features that comply with accessibility guidelines.

As depicted in FIG. 1, the accessibility feature detection platform 110 includes one or more front-end servers 112, one or more back-end servers 114, and one or more storage devices 122, 124, and 126. For ease of explanation, the following description assumes that the accessibility feature detection platform 110 is implemented with multiple front-end servers 112 and multiple back-end servers 114.

A user of a client device 102 can use an application 102-A to communicate with the accessibility feature detection platform 110 to, for example, request accessibility feature detection and compliance analysis for a particular physical environment. The application 102-A can transmit data to, and receive data from, the accessibility feature detection platform 110 over the network 104. The application 102-A can be implemented as a native application developed for a particular platform or a particular device, a web browser that provides a web interface, or another appropriate type of application. The application 102-A can present and detect user interactions (e.g., user's touch, mouse clicks, etc.) with various interfaces that enable, for example, the user to request the accessibility feature analysis, submit data (including images) about a particular physical environment, and to review an accessibility feature report (also referred to herein as an accessibility report or the report) with recommendations regarding accessibility feature improvements that could be made to the particular physical environment.

The front-end servers 112 of the accessibility feature detection platform 110 can transmit data to, and receive data from, client devices 102, over the network 104. For example, the front-end servers 106 can provide to, application 102-A executing on a client device 102, interfaces and/or data for presentation within the interfaces. The front-end servers 112 can also receive data specifying user interactions (e.g., data representing user clicks, time spent browsing different pages, keyboard entry, etc.) with the interfaces provided by the front-end servers 112 to the client device 102. The front-end servers 112 can update the interfaces, provide new interfaces, and/or update the data presented by the interfaces presented in application 102A based on user interactions with the client device 102.

The front-end servers 112 can also communicate with the back-end servers 114. For example, the front-end servers 112 can transmit data submitted by a user of a client device 102, e.g., data relating to a particular physical environment, for processing by the back-end servers 114, e.g., to determine whether the particular physical environment includes accessibility features that meet certain accessibility guidelines. The front-end servers 112 can also receive, from the back-end servers 114, data relating to whether the particular physical environment includes accessibility features that meet certain accessibility guidelines for a particular user of a client device 102 and/or recommendations for how features or structures in the particular physical environment can be updated or modified to achieve compliance with the accessibility guidelines. Such data received by the front-end servers 112 from the back-end servers 114 can then be transmitted to the client device 102, where this data is presented, e.g., in a report format within a user interface of the application 102-A.

As depicted in FIG. 1, the back-end servers 114 include an accessibility feature detection model 116, a post-processing engine 118, and a recommendation engine 120. As used in this specification, the term "engine" refers to hardware, e.g., one or more data processing apparatuses, which execute software and/or programming instructions, to perform a set of tasks/operations.

The accessibility feature detection platform 110 also includes one or more storage devices (e.g., a database, a repository, or another non-transitory data store) within which user input data and other data can be stored. For example, the platform 110 in FIG. 1 is depicted as including a report data storage device 122, an accessibility guidelines storage device 124, and a training image storage device 126. Although shown as three separate storage devices, one skilled in the art will appreciate that the data stored in these storage devices could be stored in a single storage device or in two or more storage devices.

The report data storage device 122 stores the user input data (including image and non-image data) as well as the outputs generated by the accessibility feature detection model 118 and the recommendation engine 120 (as further described below). The accessibility guidelines storage device 124 stores a list of accessibility features and the corresponding guidelines for those accessibility features. In some implementations, the accessibility guidelines storage device 124 can include accessibility guidelines that are manually identified and input (e.g., into a database by an administrator using the administrator device 106). Alternatively, the accessibility guidelines storage device 124 can communicate with a software agent executing on the administrator device 106, which automatically parses different accessibility guidelines (e.g., the American Disability Act Accessibility Guidelines) and stores the parsed accessibility guidelines in the accessibility guidelines storage device 124. The training images storage device 126 includes training images that are used to train the accessibility feature detection model 116 (as further described with reference to FIGS. 3 and 4).

The structure and operation of the above-described components is described in the following paragraphs with reference to FIGS. 2A and 2B, as well as in FIGS. 3 and 4.

FIG. 2A depicts an environment 200 (which is, e.g., a subset of the environment 100) that is leveraged in detecting accessibility features for a particular physical environment and determining whether those accessibility features meet (i.e., are compliant with) accessibility guidelines.

As depicted in FIG. 2A, a user of a client device 102 can submit, via application 102-A and to the accessibility feature detection platform 110, a request to evaluate the accessibility of a particular physical environment. In some implementations, the user of the client device 102-A can use a web browser to navigate to a website corresponding to the accessibility feature detection platform 110. On this website, the user of the client device 102 can request to create an accessibility report for a particular physical environment, which presents the user with a web form where the user can input relating to the particular physical environment (e.g., a school, a building, etc.).

In some implementations, an administrator of an administrator device 106 can generate a web form that provides a comprehensive form requesting structural details for different types of physical environments (e.g., schools, buildings, etc.). The administrator can generate the web form by specifying the various fields to include on the form and the type of input to accept for each field (e.g., keyboard input for text or number entry, mouse input to select/deselect a checkbox or radio button, etc.). In some implementations, instead of or in addition to the administrator's specification of web form fields, the administrator device 106 can include an automated agent that is configured or programmed to generate a list of questions (based on accessibility guidelines stored in the accessibility guidelines storage device 124). Thus, when a user requests to run an accessibility report for a particular physical environment, an administrator and/or automated agent-defined web form can be generated and provided within an interface to the client device 102.

Figure 2B:
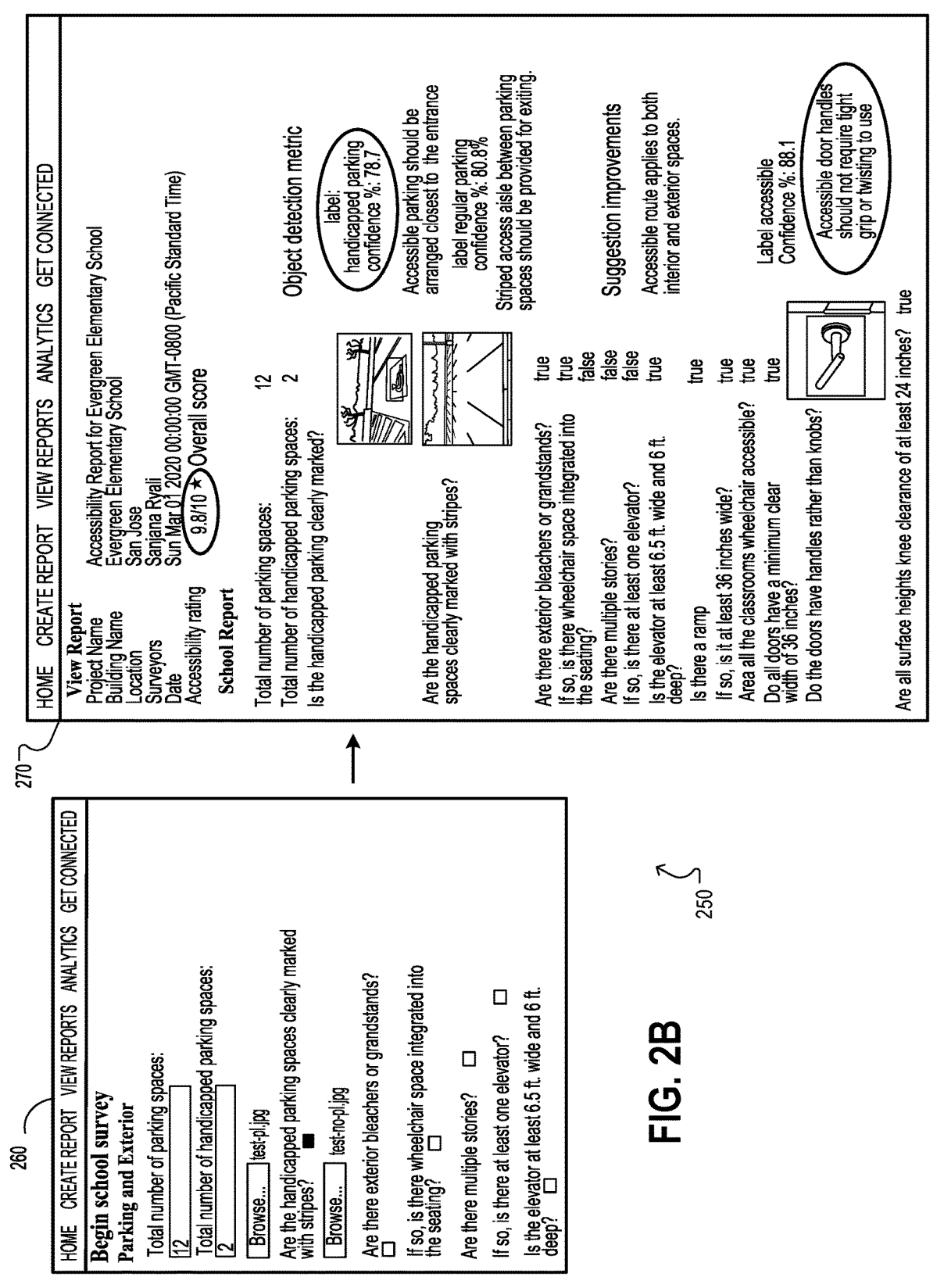

An example of such a web form where the user of client device 102 can input data is shown in FIG. 2B (250). Web form 260, as shown in FIG. 2B, allows a user to enter text data in form fields as well as upload (e.g., as attachments) images depicting portions of the particular physical environment (e.g., the parking lot, the bathrooms, rooms). For example, web form 260 includes text boxes where the user can specify, e.g., the total number of parking spaces and the number of handicap spaces for a school (which can be one example of a particular physical environment). The form 260 also includes check boxes where the user can specify, e.g., (1) whether the school includes bleachers or grandstands and if so, whether wheelchair space is provided in such seating, and (2) whether the school includes multiple stories and if so, whether the school includes an elevator. Additional fields of the form are depicted in form 260 and the corresponding output report generated in report 270 (described below). In this manner, the user of client device 102 can provide data descriptive of a particular physical environment, where the data can include image data depicting images of portions of the particular physical environment (e.g., the parking lot, the bathrooms, rooms), as well as non-image data (e.g., text data) that describes or quantifies attributes or features of the particular physical environment (e.g., data identifying number of parking spaces, number of seats in a room, whether the physical environment includes an elevator, etc.).

In some implementations, instead of or in addition to the user providing data descriptive of a particular physical environment, such descriptive data can be obtained from third party sources. For example, such data can be obtained from web services where third party users post data (e.g., reviews) and images of the particular physical environment. In such implementations, the accessibility feature detection platform 110 can implement a web scraping tool that accesses these third party sources and extracts data relating to the particular physical environment (i.e., data similar to that collected based on user input into form 260). In this manner, the user of client device 102 need not enter data (i.e., the image data and/or the non-image data described above and depicted in form 260) about the particular environment and instead, such data can be inferred or obtained from third party data sources.

After the user of client device 102 enters the data in web form and submits the request (or after such data is obtained from third party data sources), the request and the associated data for the particular physical environment is transmitted, over network 104, to the accessibility feature detection platform 110 where it is processed further by the accessibility feature detection model 116 and/or the post-processing engine 118.

The accessibility feature detection model 116 can be implemented as one or more machine learning models that determines whether an image of a particular physical environment (or a portion thereof) includes one or more structural features (e.g., a door handle, a faucet, etc.) and whether those structural features are compliant with accessibility guidelines. In this regard, the accessibility feature detection model 116 performs object detection to identify objects in an input image and classify those detected objects as "accessible" or "not accessible" (i.e., the classification establishes whether the detected objects comply with accessibility guidelines). The accessibility feature detection model 116 thus identifies objects in images (e.g., ramps, handicap signs in handicap parking, door handles) and classify the identified objects as accessible or inaccessible.

In some implementations, the accessibility feature detection model 116 can be implemented as a supervised machine learning model (e.g., a model implemented using convolutional neural networks or recurrent neural networks) that receives, as input, an image of a physical environment or a portion thereof (e.g., a front view of a building and its parking lot, a parking lot of a building, an image of a bathroom and its sinks, etc.) and generates an output indicating whether physical environment includes one or more structural features that are compliant with accessibility guidelines. In general, neural networks employ one or more layers of models to generate an output, e.g., a classification, for a received input. Some neural networks include one or more hidden layers in addition to an output layer. The output of each hidden layer is used as an input to the next layer, i.e., the next hidden layer or the output layer of the network. Each layer of the network generates an output from the received input in accordance with current values of a respective set of parameters.

As described above, in some implementations, the accessibility feature detection model 116 can utilize, as a starting point, a pre-trained model for object detection and scene classification (e.g., using an Amazon Rekognition model), which can be customized with custom labels relating to accessibility features. When so customized, the model training and parameter tuning as part of the model training can be performed using a relatively smaller training dataset (e.g., a training dataset of hundreds of images compared with the thousands of images that are normally required for model training). This in turn results in a shorter time and reduced resource utilization for model training relative to convention model training techniques. Similar resource efficiencies can be obtained by using transfer learning techniques applied to established object detection/scene classification models (such as, e.g., EfficientNet, ResNet, ResNext, or other models, such as those based on the Inception architecture, etc.) to which a curated training dataset of training images can be provided and for which the parameters can be adjusted (similar to pre-trained models such as those provided by Rekognition) to achieve the desired model performance.

For example, the accessibility feature detection model 116 can be trained to detect faucets, and in particular, it can be trained to identify accessible faucets as well as inaccessible faucets (e.g., using images of both types of faucets). Then, when the trained accessibility feature detection model 116 is deployed, it can detect and differentiate between accessible and inaccessible faucets, and generate an output reflecting the identification of the structural feature (i.e., the faucet) and an indication of accessibility (i.e., whether the faucet is an accessible faucet or an inaccessible faucet). As another example, the accessibility feature detection model 116 can be trained to detect parking spaces (e.g., as delineated by parallel white lines), and in particular, it can be trained to identify handicap parking spaces (e.g., as identified by the presence of a handicap/wheelchair sign within the parking space). The trained accessibility feature detection model 116 can then detect and differentiate between an accessible parking space (i.e., one that has handicap/wheelchair sign in the parking space) and a regular parking space, and generate an output reflecting the identification of the structural feature (i.e., the parking spaces) and an indication of accessibility (i.e., accessible parking space or inaccessible parking space). In this manner, one skilled in the art will appreciate that the accessibility feature detection model 116 can be trained to detect structural features in an image and classify those detected features are accessible or inaccessible.

Although the accessibility feature detection model 116 is depicted as a single block, in some implementations, a separate model can be trained and deployed for each structural feature that is being evaluated for accessibility guideline compliance. For example, the accessibility feature detection model 116 can include multiple sub-models, with each sub-model trained to detect a particular structural feature, e.g., faucets, parking spaces, cross-hatched parking spaces, door handles, and quiet zones, and its compliance with accessibility guidelines.

Alternatively, the accessibility feature detection model 116 can be implemented as a single integrated model that can detect the presence or absence of multiple structural features from one or more input images and generate an output specifying whether the detected structural features are accessible or inaccessible (i.e., whether the detected structural features comply with accessibility guidelines). In such implementations, one or more input images can be input into the model and the model can then generate an output indicating whether each of the multiple structural features on which the model is trained are present or absent from the input image(s), and whether those features comply with accessibility guidelines. As explained in the Summary section above, while a single integrated model achieves the same performance and accuracy as multiple separate sub-models, it can offer significant computational resource and performance efficiencies relative to an implementation including multiple, separate sub-models.

In some implementations, the output of the accessibility feature detection model 116 can be provided to the post-processing engine 118 and/or the recommendation engine 120.

The post-processing engine 118 can be used to perform additional processing beyond that offered by the accessibility feature detection model 116. In some implementations, the post-processing engine 118 can perform (1) additional processing of images already processed by the accessibility feature detection model 116, (2) process an image in the first instance (i.e., where the image has not also been processed by the accessibility feature detection model 116), and/or (3) process non-image data (e.g., text or other survey data received from a client device 102) alone or in combination with image data to determine whether certain accessibility guidelines are met.

The following is an example of the processing performed by the post-processing engine 118 with respect to images already processed by the accessibility feature detection model 116. In this example, assume that the accessibility feature detection model 116 determines that a particular accessibility feature, such as a wheelchair accessible space, is present in an image. The post-processing engine 118 can then further process the image to determine whether that accessibility feature (i.e., the wheelchair accessible space) meets accessibility guideline for wheelchair accessible spaces, e.g., whether the wheel chair accessible space is at least 36-inches wide. In some implementations, the post-processing engine 118 can implement an image measurement algorithm (or can interact with other systems, e.g., via application programming interface (API) calls, to invoke such an algorithm) to process the image and compute area measurements of the wheelchair space identified in the image. The post-processing engine 118 then compares the computed measurements for the wheelchair space with the accessibility guideline for that space (e.g., a width of at least 36-inches), which can be stored in and obtained from the accessibility guidelines storage device 124.

If the post-processing engine 118 determines that the accessibility guideline is met (i.e., the wheelchair accessible space is at least 36-inches wide), it generates an output indicating that the wheel chair accessible space meets the guidelines for this feature. On the other hand, if the post-processing engine 118 determines that the accessibility guideline is not met, it generates an output indicating that the wheel chair accessible space does not meet the guidelines for this feature. The post-processing engine 118 transmits these outputs to the recommendation engine 120.

Additional examples of post-processing that may be performed on input images includes, but is not limited to: (1) determining whether a van accessible space is at least 11-feet wide with an access aisle at least 5-feet wide; and (2) determining whether a counter surface of at least one aisle is no more than 38-inches above the floor. Similar to the above example, the post-processing engine 118 can implement an image measurement algorithm (or can interact with other systems, e.g., via application programming interface (API) calls, to invoke such an algorithm) to process the image and compute the appropriate measurements and compare these measurements with the corresponding accessibility guideline for that structural feature (as retrieved from the accessibility guidelines storage device 124).

As noted above, the post-processing engine 118 can also process the input image data (as may have already been processed by the accessibility feature detection model 116) together with the non-image data to determine whether certain structural features meet accessibility guidelines for those features. For example, the post-processing engine 118 can receive user input regarding seating spaces available in a room and a determination that wheelchair accessible spaces are available in the same room (based on the processing of the accessibility feature detection model 116). Using this information, the post-processing engine can then compute whether at least 5% of the total space includes wheelchair accessible space (as is required to meet ADA accessibility guidelines). In the above example, the accessibility feature detection model 116 can generate an output indicating that an input image of a room includes two wheelchair accessible spaces, and the user of client device 102 can provide a survey input stating that the room has forty (40) seats. The post-processing engine 118 can then utilize these inputs to determine whether 5% of the room's space includes wheelchair spaces. Specifically, the post-processing engine 118 determines that the room should include two wheelchair spaces to meet accessibility guidelines (since 5% of 40 is 2) and compares this number to the actual number of wheelchair spaces detected in the room. Because two wheelchair spaces were detected in the room, the post-processing engine 118 determines that the room provides an adequate number of wheelchair accessible spaces, in compliance with accessibility guidelines. The post-processing engine sends this determination to the recommendation engine 120.

Similar to the above example, the post-processing engine 118 can determine whether an adequate number of wheelchair spaces are provided based on a number of seats in a room. For example, current ADA guidelines require that: (1) if the total number of seats in a room is between twenty-six and fifty, two wheelchair spaces must be provided in the room; (2) if the total number of seats in a room is between fifty-one (51) and 150, four wheelchair spaces must be provided in the room; and (3) if the total number of seats in a room is between 151 and 300, five wheelchair spaces must be provided in the room. The post-processing engine 118 can perform the above-described processing to assess whether an adequate number of wheelchair spaces are available in a room, depending on the number of seats included in the room.

As explained above, the accessibility feature detection model 116 and the post-processing engine 118 provide, to the recommendation engine 120, data indicate whether the particular physical environment includes one or more structural features and if so, whether those structural features meet/are compliant with accessibility guidelines for those structural features. Based on this data, the recommendation engine 120 generates a report output, identifying the results of the accessibility analysis for a particular physical environment and recommendations for how accessibility for the particular physical environment can be improved. For example, the recommendation engine 120 can generate an accessibility report indicating whether particular accessible features are present in a physical environment, whether those detected accessible features meet guidelines, and what features can be added or modified to make the particular physical environment more accessible (or to achieve compliance with accessibility guidelines). The recommendation engine 120 can provide this accessibility report, via the front-end servers 112, to the client device 102 for presentation with an interface of the application 102-A.

An example of the generated accessibility report is shown in FIG. 2B. As shown in FIG. 2B, the accessibility report 270 includes the survey data supplied by the user (and/or received from third party sources), as well as data relating to outputs of the processing by the accessibility feature detection model 116 and/or the post-processing engine 118. As shown in FIG. 2B, the accessibility feature detection model 116 identifies data, as reflected in the report 270, regarding whether the handicapped parking is clearly marked with a wheelchair image, and whether the door handles have knobs instead of handles. Although not reflected in report 270, the post-processing engine 118 can process an image of a handicap ramp to evaluate whether it is at least 36 inches wide. If the post-processing engine 118 determines that the handicap ramp is at least 36-inches wide, it outputs data indicating the same (e.g., a value of 1, or text data such as true or yes) and the recommendation engine 120 can then generate data on the report an output reflecting this determination (e.g., in report 270, "true" is listed next to the question "if so, is [the ramp] at least 36 inches wide").

In some implementations, the recommendation engine 120 can also output the accessibility guideline corresponding to a particular structural feature and further provide a recommendation for improvement or modification of the non-compliant structural feature, or the addition of a structural feature that is compliant with accessibility guidelines. In such implementations, the recommendation engine 120 can use the particular accessibility feature to lookup the corresponding accessibility guidelines from the accessibility guidelines storage device 124. FIG. 2A shows an example of a table that may be stored in the accessibility guidelines storage device 124, where the table identifies different structural features, their corresponding accessibility guidelines, and an example or type of structure that is accessibility compliant.

Additionally, and as shown in FIG. 2B, the accessibility report can include an individual accessibility score for each accessibility/structural feature evaluated, as well as an overall accessibility score for the physical environment. In some implementations, an accessibility score can be a numerical value (e.g., a 0 or 1, or a value ranging from 0.0 to 1.0) indicating how likely a particular structure feature complies with an accessibility guideline. For example, an accessibility score can be a model output relating to the accessibility compliance of a particular structural feature. In some implementations, The accessibility score can be aggregated (e.g., added up) for a particular category of structural features (e.g., bathroom accessibility, which would aggregate accessibility scores for all structural features measured in the bathroom). This computed score can be further aggregated (e.g., added up) across all structural features and/or all categories for structures to obtain an aggregate accessibility score for the physical environment (which can inform the accessibility compliance/readiness of a particular physical environment). In some implementations, one or more of the computed accessibility scores can be normalized on a scale of 0.0 and 1.0.

Thus, using the accessibility guideline data stored in the accessibility guidelines storage device 124, the recommendation engine 120 can obtain the appropriate accessibility guideline for the structural feature and an example of an accessible feature, to generate a recommendation for the type of addition, update, or modification to make to the detected structural feature.

For example, if a structural feature, such as a handicap ramp, is determined to be inaccessible (e.g., based on the processing by the model 116 and post-processing engine 118), the recommendation engine 120 can identify the accessibility guideline for the ramp from the accessibility guideline storage device 124 (e.g., "ramp must be at least 36-inches wide") and provide a recommendation for the adjustment needed (e.g., "ramp is currently 24 inches wide; widen by 12 or more inches to be ADA compliant"). As this example illustrates, the recommendation engine 120 can use the current ramp measurements and compare these to the ramp width accessibility guidelines to generate a specific and actionable recommendation.

As another example, if a door handle is determined to be handicap inaccessible (e.g., a knob-style handle is detected and identified as inaccessible by the accessible feature detection model 116), the recommendation engine 120 can identify the accessibility guideline for door handles ("door handles should not require tight grip or twisting to use") and provide a recommendation for the adjustment needed (e.g., "replace door handles with lever handles"). As this example illustrates, the recommendation engine 120 generates a recommendation based on example accessible door handles that are identified from the accessibility guidelines storage device 124.

Returning to FIG. 2A, the above-described report data output (e.g., the report 270 depicted in FIG. 2B) by the recommendation engine 120 (as well as the data received via the user input and/or from third party sources) is stored in the report data storage device 122. This enables the report for the particular physical environment to be available on demand in the future. The recommendation engine 120 can also transmit this report data output for provision within an interface provided on the client device 102 (e.g., as a report output similar to the report 270 depicted in FIG. 2B).

In some implementations, the recommendation engine 120 can also identify accessibility specialists who can work with the operator(s) of the particular physical environment to perform the recommended adjustments or modifications. For example, the recommendation engine 120 can access a predefined database that may be resident in the accessibility detection feature platform 110, to identify specialists or personnel who can perform the recommended adjustments or modifications to particular structural features. In this example, the accessibility detection feature platform 110 can be configured with a database that identifies service personnel or entities that can perform the adjustments or modifications relating to each structural feature on which recommendations are offered by the recommendation engine 120. Alternatively, or additionally, the recommendation engine 120 can access third party services or information sources to identify personnel or entities who can perform the adjustments or modifications relating to each structural feature on which recommendations are offered by the recommendation engine 120. In such implementations, and as one example, the recommendation engine 120 can be configured to search known service personnel aggregator web services to search for personnel/entities who can perform the required adjustments, improvements, or additions, to achieve compliance with accessibility guidelines.

In this manner, the accessibility feature detection platform 110 can use the user-supplied input data regarding a particular physical environment (which data can include image and non-image data) and/or data about the particular physical environment from one or more third party sources, to generate an accessibility report that summarizes the accessibility features of the particular physical environment, the compliance of these features with accessibility guidelines, and recommendations for additions, improvements, or modifications of the particular physical environment to achieve compliance with accessibility guidelines.

Returning to FIG. 1, the environment 100 depicted also includes an administrator device 106, which can be used by an administrator (e.g., via application 106-A), to configure the accessibility feature detection platform 110. In some implementations, an administrator using the administrator device 106 can provide a set of training images that can be stored in the training images storage device 126. The administrator can further utilize application 106-A to label the training images, train the model using the training images, review performance of the model after each round of model trainings, and/or configure features/parameters of the model to fine-tune/refine the performance of the model 116. Additional details about the training of the accessibility feature detection model 116 are described with reference to FIGS. 3 and 4.

Figure 3:
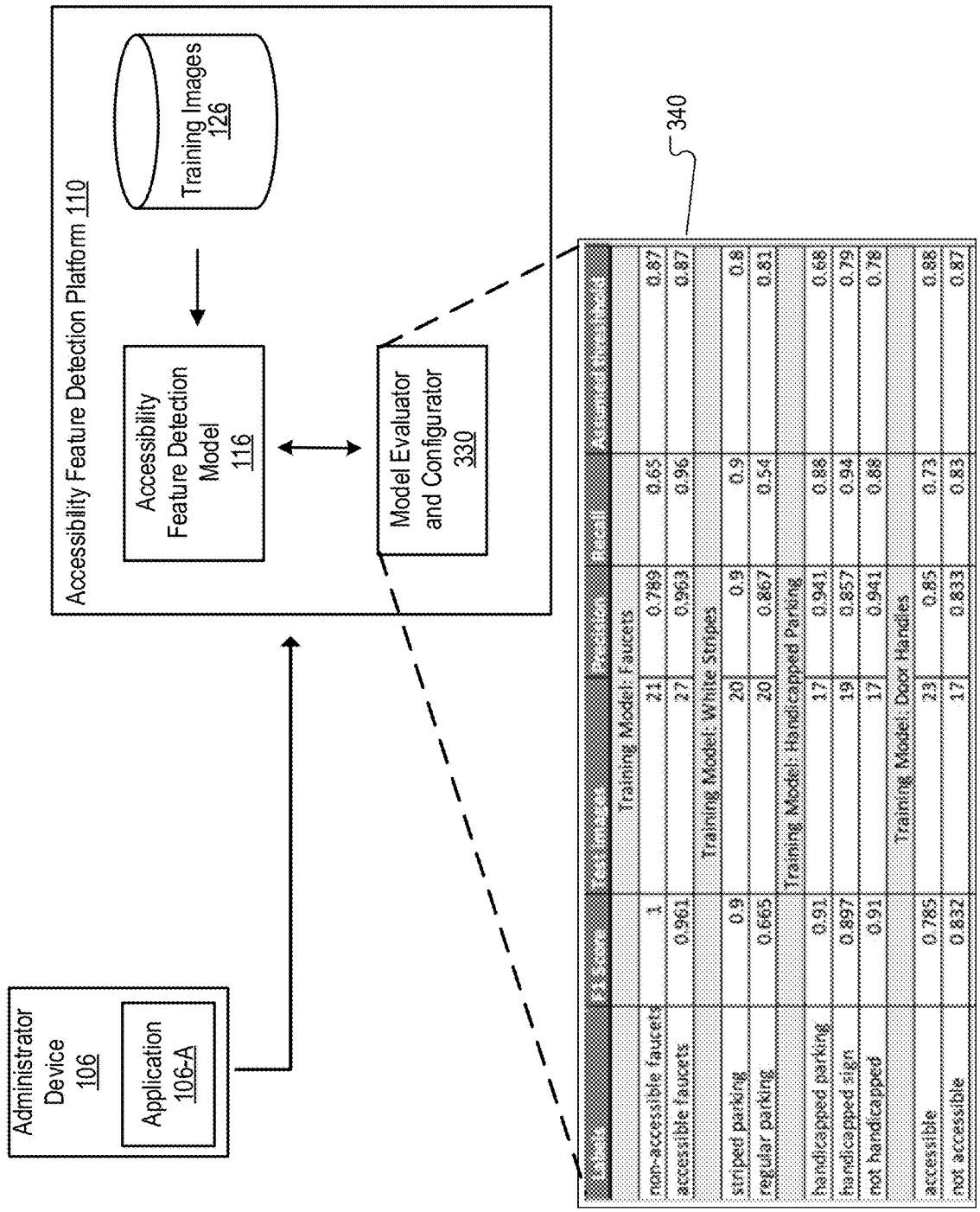
FIG. 3 is a block diagram that depicts a subset of the environment shown in FIG. 1, which is leveraged in training the accessibility feature detection model depicted in FIG. 1.
Figure 4:
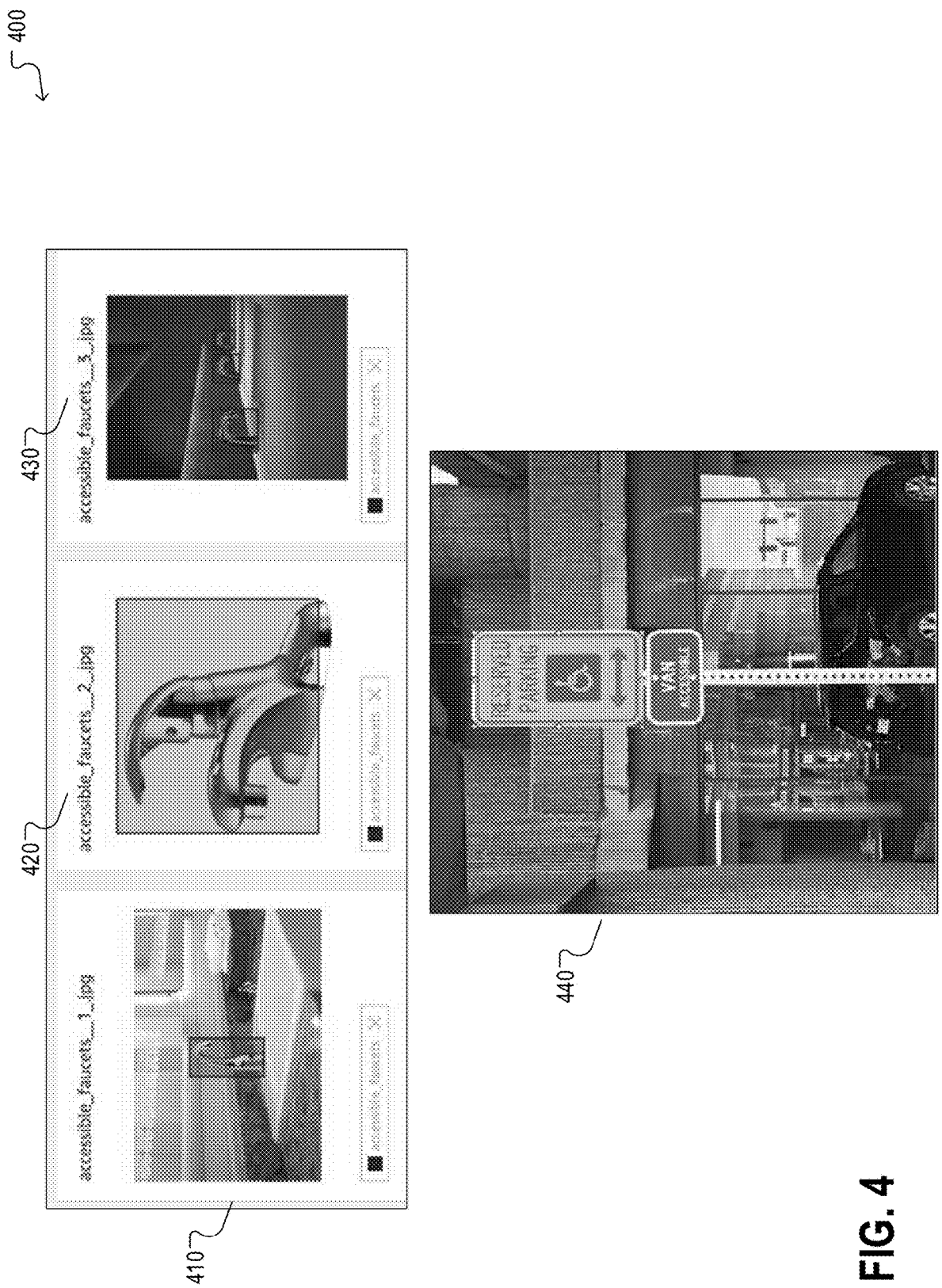
FIG. 4 depicts example images 400 of faucets and handicaps signs that are identified in training images using bounding boxes and labeled as accessible.

FIG. 3 is a block diagram that depicts a subset of the environment shown in FIG. 1, which is leveraged in training the accessibility feature detection model depicted in FIG. 1.

As shown in FIG. 3, an administrator device 106 can interact with the accessibility feature detection platform 110 to train the accessibility feature detection model 116. In particular, the accessibility feature detection platform 110 can include a model evaluator and configurator 330 that enables an administrator to train and refine the model via the administrator device 106 (and the application 106-A). As described above, the accessibility feature detection model 116 can be implemented as a single, integrated model or as multiple sub-models, with each sub-model trained to detect a particular structural feature and determine whether that structural feature is compliant with an accessibility guideline. One skilled in the art will appreciate that the same training steps would be applied when training multiple sub-models that each determine accessibility compliance for a respective structural feature, or a single integrated model that determines accessibility compliance for multiple structural features. As such, for brevity and ease of explanation, the following describes model training for a single sub-model in an environment where the accessibility feature detection model 116 is implemented with multiple sub-models.

In some implementations where a single sub-model is being trained, the administrator device 106 can initially transmit multiple training images for storage in a training images storage device 126. By interacting with the model evaluator and configurator 330, the administrator can identify one or more objects in each training image and assign a label reflecting a classification for the identified object. For example, when training a sub-model directed to identifying accessibility compliance of faucets, the administrator can use bounding boxes to identify faucets in the provided training images (as shown by images 410, 420, and 430 in FIG. 4), and include a label (e.g., "accessible" or "inaccessible") reflecting accessibility/inaccessibility for the identified faucet in each training image. As another example, when training a sub-model directed to identifying accessibility compliance of parking spaces, the administrator can use bounding boxes to identify signs in the provided training images (as shown by image 440 in FIG. 4), and include a label reflecting accessibility/inaccessibility of the parking space based on the presence or absence of the sign.

Using the model evaluator and configurator 330, the administrator can then initiate training of the accessibility feature detection model 116 using the training images. In some implementations, the training is performed over multiple training rounds/iteration.

In each training round/iteration, a set of images from the training images storage device 126 are used to train the model 116. In some implementations, the set of images used to train the model 116 is split into two subsets: a first training image dataset and a second test image dataset. The model 116 is trained using the first training image dataset, with the goal of reducing or minimizing a loss or objective function. The loss function or objective function is a function that depends on the (i) model output generated by the model 116 by processing a given training item and (ii) the label for the training item, i.e., the target output that the model 116 should have generated by processing the training item. In this manner, the model is trained to minimize the objective/loss function by performing multiple iterations/rounds of training on the training images, e.g., stochastic gradient descent with backpropagation, to iteratively adjust the values of the parameters of the model 116.

After each training round/iteration (or preferably, after the conclusion of all training rounds/iterations), the performance of the model 116 is evaluated using the second test image dataset. In particular, each test image in the second test image dataset is input into the model 116, which results in the model 116 predicting whether the image includes the particular label (i.e., the classification of whether an identified structural feature in the image complies with an accessibility guideline or not). Based on the model 116's outputs with respect to the test dataset, the model evaluator and configurator 330 computes a set of model performance metrics for the model 116. The computed model performance metrics can include, e.g., precision, recall, and an F1 score. Precision the fraction of correct predictions (true positives) over all model predictions (true and false positives) at the assumed threshold for an individual label. Recall is the fraction of the test set labels that are predicted correctly above the assumed threshold (which is value above which a model prediction is counted as a true or false positive). F1 score is the harmonic mean of precision and recall scores at the assumed threshold. A high value for the F1 score indicates that the model is performing well for both precision and recall, while a low value for F1 score indicates that the model is not performing well with respect to precision, recall, or both.

FIG. 3 depicts a table 340, listing the performance metrics for each sub-model (i.e., models relating to faucets, white stripes, handicapped parking, door handles) trained using the techniques described herein. As shown, each of the multiple sub-models listed in the table 340 generally achieved an F1 score of about 0.7 or above, with the average F1 score across all sub-models of 0.87. This indicates that the model 116 achieved high recall and precision over the course of the training in the manner described herein.

In some implementations, the model performance can be improved by increasing the number of training images over which the training is performed. For example, during testing, it was observed that increasing the training image dataset from fifty labeled images to 200 labeled images resulted in an improvement of F1 scores from 0.33 to 0.95 for certain sub-models.

In some implementations, the model 116's performance can be further fine-tuned by adjusting the model's minimum confidence threshold (where a model's confidence value reflects the model's confidence in the accuracy of the label and the bounding box). Setting a higher confidence value increases the precision of the model (by reducing the number of false positives output by the model), and has the effect of increasing the assumed threshold.

In this manner, the model 116 can trained over multiple training images to detect whether structural features in images are compliant with accessibility guidelines. After the model 116 is trained, the model 116 can be invoked to perform the accessibility feature analysis (as described with reference to FIGS. 2A and 2B.

Figure 5:
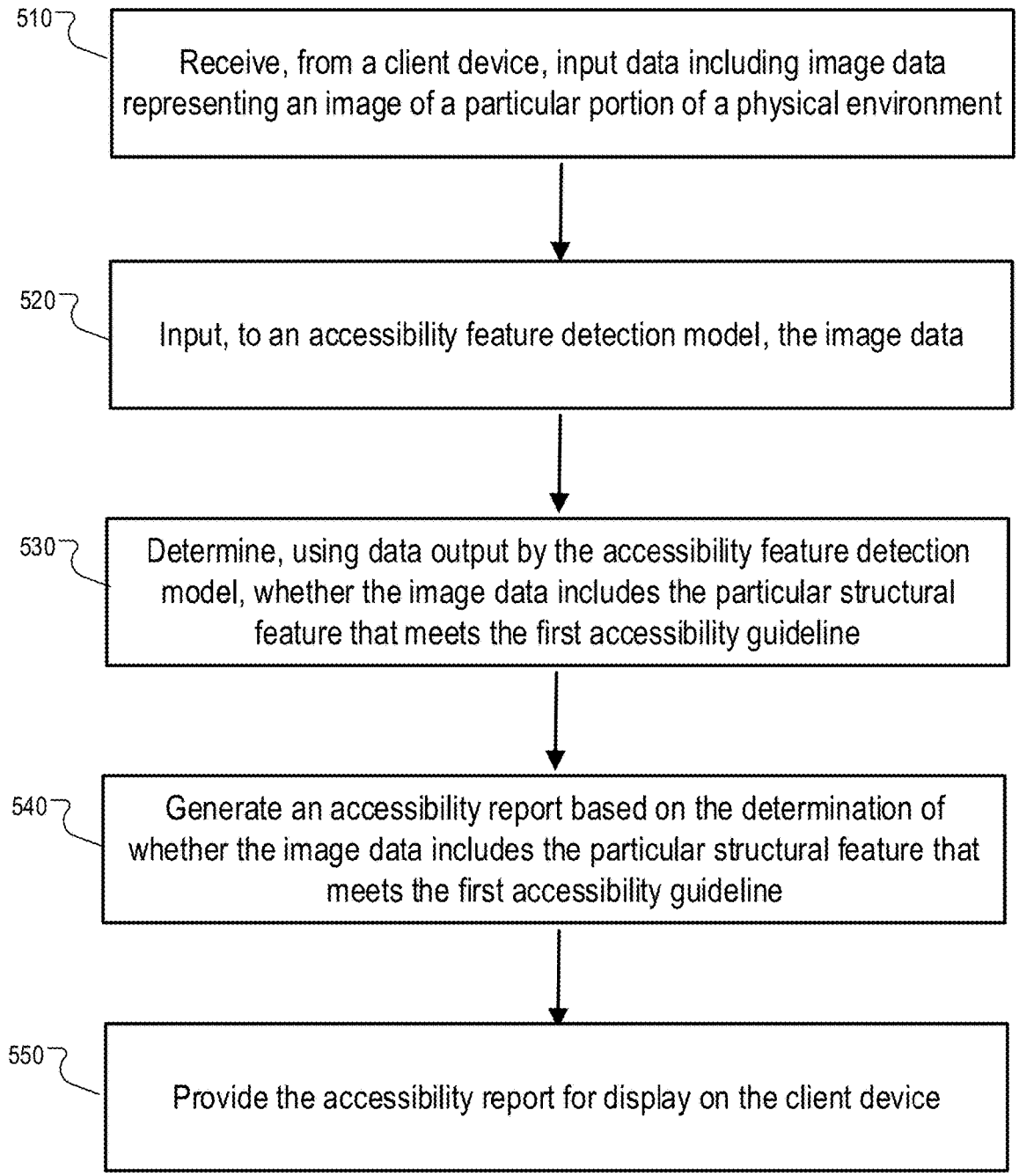
FIG. 5 is a flow diagram of an example process for detecting structural features for a particular physical environment and determining whether those features meet accessibility guidelines.

FIG. 5 is a flow diagram of an example process 500 for determining whether a particular physical environment includes structural features that comply with accessibility guidelines. Operations of the process 500 can be implemented as instructions stored on one or more computer readable media, which may be non-transitory, and execution of the instructions by one or more data processing apparatus (e.g., a hardware processor) can cause the one or more data processing apparatus to perform the operations of the process 300. For purposes of the FIG. 5 description, operations of the process 500 are illustratively described as instructions being implemented/executed by the accessibility feature detection platform 110 and its associated components (as described with reference to FIGS. 1-4).

The accessibility feature detection platform 110 receives, from a client device, input data including image data representing an image of a particular portion of a physical environment (at 510). As described with reference to FIGS. 1, 2A, and 2B, in some implementations, a user of a client device 102 can navigate to a web site or service provided by the accessibility feature detection platform 110. There, the user of the client device 102 can request to generate an accessibility report for a particular physical environment/ location (e.g., a hotel, a school, a building, etc.). As shown in FIG. 2B and as described with reference to FIGS. 1 and 2A, the user of the client device 102 can be prompted to enter, in a web form, data relating to attributes (e.g., number of parking spaces, number of seats in a room, etc.) for one or more structural features (e.g., parking spaces, faucets, etc.). This data can also include image data that the user can upload in the form as one or more attachments, as shown in FIG. 2B. The uploaded image data represents an image of a particular portion of the physical environment (e.g., a front entrance of a building, a parking lot for a hotel, a room in a school's classroom, etc.).

After the user enters the data requested by the web form, the user of the client device 102 can submit the request to generate an accessibility report for the particular physical environment. This request, which can also include the data entered in the web form, can be transmitted to, and received by, the accessibility feature detection platform 110, over the network 104.

Moreover, as described above with reference to FIGS. 1 and 2A, the data relating to the attributes of one or more structural features of the physical environment need not be provided by the user of the client device 102. In some implementations, such data (including image data) can be obtained/received from one or more third party data sources that store such data relating to the physical environment. For example, in such implementations, after a user requests an accessibility report for a physical environment, the user may not provide any data on the form (e.g., form 260 in FIG. 2B). Instead, the accessibility feature detection platform 110 can obtain the same or similar type of data from third party data sources, and use such obtained data for its subsequent analysis.

The accessibility feature detection platform 110 inputs, to an accessibility feature detection model 116, the image data (at 520). In some implementations, the image data received (e.g., from the client device 102 or from a third party data source) is input to the accessibility feature detection model 116 (also referred to herein as simply model 116), which is trained to detect a particular structural feature in an input image and determine whether the particular structural feature meets a first accessibility guideline for the particular structural feature (as described above with reference to FIG. 2A).

As summarized below, and as described with reference to FIG. 3, the accessibility feature detection model is trained using a set of labeled training images. In some implementations, the model training includes obtaining a dataset including multiple training images that identify the particular structural feature using a bounding box and multiple labels corresponding to the training images. Each label that corresponds to a respective training image indicates whether the identified particular structural feature in the training image meets the first accessibility guideline.

In some implementations, the dataset can be split into a training dataset and a test dataset, e.g., using a 4:1 ratio. For example, if the dataset includes 100 images, then splitting this dataset using a 4:1 ratio results in 80 images for inclusion in the training dataset and 20 images for inclusion in the test data. The model 116 can then be trained using the training dataset and the test dataset, as summarized below and as described above in detail with reference to FIG. 3. In some implementations, the model 116 is trained using the images in the training dataset, with the objective of minimizing a loss function. After training the accessibility feature detection model using the training dataset, the model performance of the model 116 is evaluated using the test dataset. This evaluation can include, e.g., obtaining, from the accessibility feature detection model 116 and using images in the test dataset, model predictions corresponding to the images in the test dataset, and computing one or more model performance metrics (e.g., precision, recall, F1) based on the model predictions obtained for the test dataset.

In some implementations, the model 116 is considered trained and ready to deploy when the model performance metric (e.g., F1 score) meets a pre-determined performance threshold (e.g., an assumed threshold value) for the accessibility feature detection model. However, when the model performance metric (e.g., F1 score) does not meet a pre-determined performance threshold (e.g., an assumed threshold value) for the accessibility feature detection model, the model training can iteratively continue in one or more additional training rounds. Alternatively, the training can iteratively continue until a predetermined number of rounds or iterations have been completed (e.g., 100, 200, etc.). The trained model can then be deployed and used to make accessibility compliance predictions for input images (as described in the next operation).

The accessibility feature detection platform 110 determines, using data output by the accessibility feature detection model 116, whether the image data includes the particular structural feature that meets the first accessibility guideline (at 530). As described with reference to FIGS. 1, 2A, and 2B, the accessibility feature detection model 116 generates an output indicating whether the input image includes a particular structural feature and whether that structural feature meets a first accessibility guideline.

Moreover, in some implementations, additional post-processing may be performed on the input data (including the image data) to assess whether the particular structural feature meets one or more additional accessibility guidelines (e.g., a second accessibility guideline). For example, and as described with reference to FIG. 2A, the post-processing engine 118 can determine, using an image processing algorithm, data for an attribute (e.g., a width) relating to the particular structural feature (e.g., a handicap ramp) detected in the image data, and determine, based on this attribute data, whether the particular structural feature meets a second accessibility guideline for the particular structural feature (e.g., the width of the ramp is at least 36-inches). This determination includes identifying an accessibility threshold (e.g., at least 36-inches) corresponding to this second accessibility guideline.

When the data for the attribute related to the particular structural feature meets the accessibility threshold, the post-processing engine 118 determines that the particular structural feature meets the second accessibility guideline for the particular structural feature. On the other hand, when the data for the attribute related to the particular structural feature does not meet the accessibility threshold, the post-processing engine 118 determines that the particular structural feature does not meet the second accessibility guideline for the particular structural feature. In some implementations, the output of the model 116 and the post-processing engine 118 can be provided to a recommendation engine 120 (as described in the following operation).

The accessibility feature detection platform 110 generates an accessibility report based on the determination of whether the image data includes the particular structural feature that meets the first accessibility guideline (at 540). In some implementations, the output of the model 116 and the post-processing engine 118 are provided to the recommendation engine 120, which uses this data to generate an accessibility report. Using the output data (which includes a determination of whether the particular structural feature meets the above-described first and/or second accessibility guidelines), the recommendation engine 120 generates an accessibility report (as described with reference to FIGS. 1, 2A, and 2B). In some implementations, the recommendation engine 120 generates the accessibility report using (1) data indicating that the image data includes the particular structural feature, (2) data indicating whether the particular structural feature meets the first accessibility guideline and the second accessibility guideline, and (3) recommendation data descriptive of an adjustment or an addition required to the particular structural feature, for compliance with accessibility guidelines for the particular structural feature (as described above with reference to FIGS. 1, 2A, and 2B).

The accessibility feature detection platform 110 provides the accessibility report for display on the client device (at 550). In some implementations, and as described with reference to FIGS. 1 and 2A, the recommendation engine 120 can provide the generated accessibility report for display within an interface provided on the client device 102.

Figure 6:
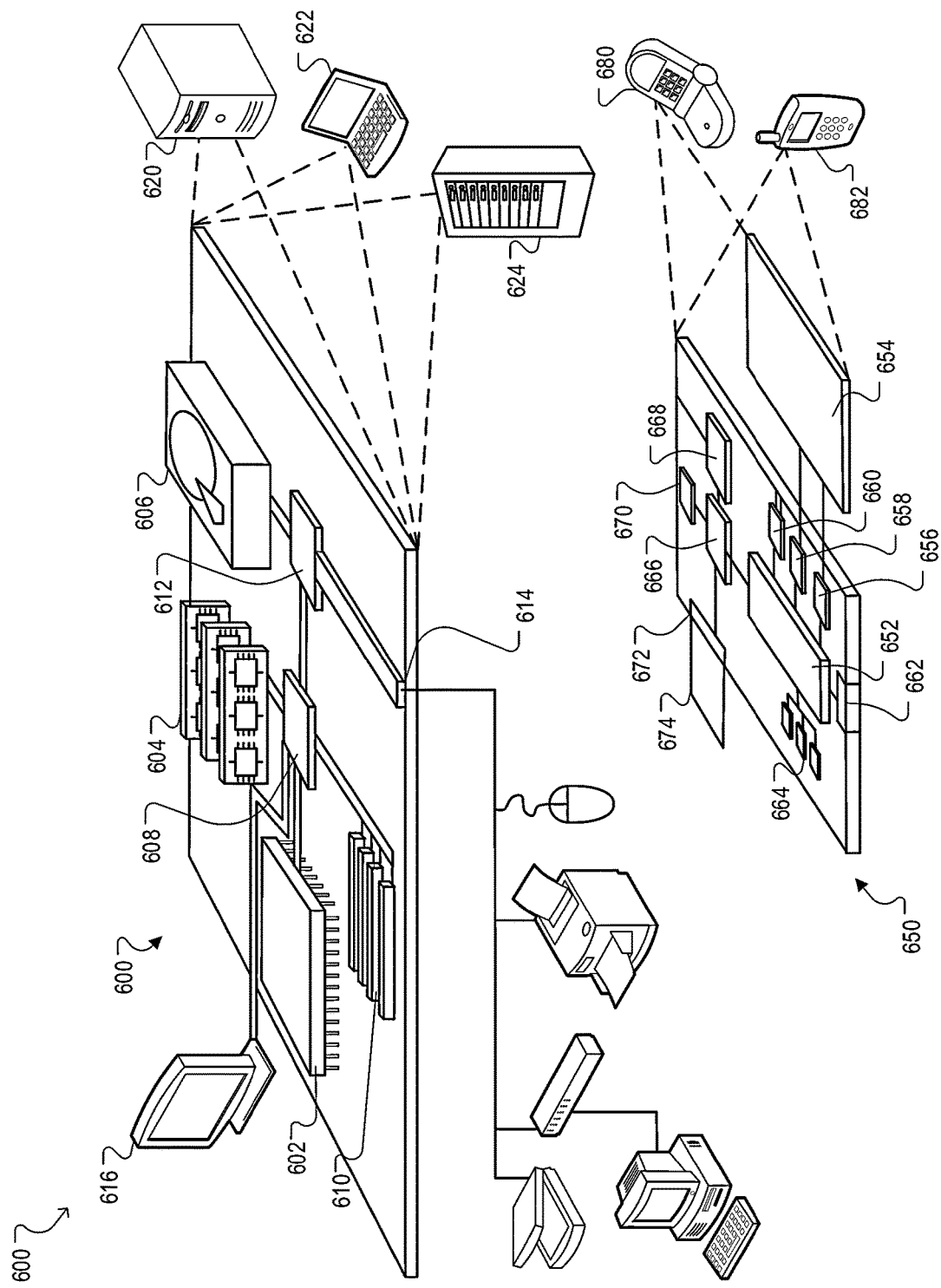
FIG. 6 is a block diagram of an example computer system.

FIG. 6 is a block diagram of computing devices 600, 650 that may be used to implement the systems and methods described in this document, either as a client or as a server or plurality of servers, or in cloud computing environments. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to provide examples, and are not meant to limit implementations described and/or claimed in this document.

Computing device 600 includes a processor 602, memory 604, a storage device 606, a high-speed interface 608 connecting to memory 604 and high-speed expansion ports 610, and a low-speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a hard disk device, an optical disk device, a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a Microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using Bluetooth, WiFi, or other such transceivers (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.), and may include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or another similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus, and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication, such as, a communication network. Examples of communication networks include a local area network ("LAN"), a wide area network ("WAN"), and the Internet.

The computing system can include clients and servers. A client and server are generally remote from each other and typically interact through a communication network. The relationship between client and server arises by virtue of computer programs running on the respective computers and having a client-server relationship with each other.

As used in this specification, the term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the description herein. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
   receiving, from a client device connected to a platform by a computer network, input data including image data representing an image of a particular portion of a three-dimensional (3D) physical environment;
   inputting, to an accessibility feature detection model of the platform, the image data, wherein the accessibility feature detection model is trained to detect different types of structural features and determine, for each type of structural feature, whether a particular structural feature belonging to the respective type of structural feature meets one or more accessibility guidelines for the respective type of structural feature, and wherein the accessibility feature detection model is a trained machine learning model, the training comprising:
   obtaining, for each type of structural feature from the different types of structural features, a dataset including a plurality of training images that identify the particular structural feature using a bounding box and a plurality of labels corresponding to the training images, wherein each label corresponding to a respective training image indicates whether the identified particular structural feature in the training image meets the one or more accessibility guidelines;
   generating model training outputs based on inputting a subset of the plurality of training images to the accessibility feature detection model; and
   minimizing an objective function of the accessibility feature detection model based on the model training outputs for the subset of the plurality of training images and a corresponding set of labels for the subset of the plurality of training images;
   generating, by the accessibility feature detection model and using the image data, a data output predicting whether the image data includes the particular structural feature meets the one or more accessibility guidelines for the respective type of structural feature, wherein the data output comprises a label indicating: (i) a presence of the particular structural feature in the image data and (ii) compliance of the particular structural feature with the one or more accessibility guidelines;
   generating an accessibility report based on the determination of whether the image data includes the particular structural feature that meets the one or more accessibility guidelines; and
   transmitting, to the client device and by the computer network, the accessibility report for display on the client device.

2. The computer-implemented method of claim 1, further comprising:
   determining, using an image processing algorithm and based on the data output, data for one or more visual attributes relating to the particular structural feature detected in the image data; and
   determining, based on the data for the one or more visual attributes, a second data output indicating whether the particular structural feature meets a second accessibility guideline for the particular structural feature.

3. The computer-implemented method of claim 2, wherein determining whether the particular structural feature meets the second accessibility guideline for the particular structural feature, comprises:
  identifying an accessibility threshold corresponding to the second accessibility guideline;
  when the data for the attribute related to the particular structural feature meets the accessibility threshold, confirming that the particular structural feature meets the second accessibility guideline for the particular structural feature; and
  when the data for the attribute related to the particular structural feature does not meet the accessibility threshold, determining that the particular structural feature does not meet the second accessibility guideline for the particular structural feature.

4. The computer-implemented method of claim 1, further comprising:
  receiving, from the client device, a request to generate the accessibility report for the physical environment; and
  receiving data for an attribute corresponding to one or more structural features corresponding to the physical environment, wherein the one or more structural features includes the particular structural feature.

5. The computer-implemented method of claim 4, wherein receiving data for one or more structural features corresponding to the physical environment, comprises:
  receiving, from the client device, the data for one or more structural features for the physical environment; or
  receiving, from third party data source, the data for one or more structural features for the physical environment.

6. The computer-implemented method of claim 2, wherein generating the accessibility report, comprises:
  generating, by a recommendation engine, the accessibility report using (1) the data output, (2) the second data output, and (3) recommendation data descriptive of an adjustment or an addition required to the particular structural feature, for compliance with accessibility guidelines for the particular structural feature.

7. The computer-implemented method of claim 1, wherein training the accessibility feature detection model using the set of labeled training images comprises splitting the dataset into a training dataset and a test dataset.

8. A system, comprising:
  one or more memory devices storing instructions; and
  one or more data processing apparatus that are configured to interact with the one or more memory devices, and upon execution of the instructions, perform operations including:
    receiving, from a client device, input data including image data representing an image of a particular portion of a three-dimensional (3D) physical environment;
    inputting, to an accessibility feature detection model, the image data, wherein the accessibility feature detection model is trained to detect different types of structural features and determine, for each type of structural feature, whether a particular structural feature belonging to the respective type of structural feature meets one or more accessibility guidelines for the particular structural feature, and wherein the accessibility feature detection model is a trained machine learning model, the training comprising:
      obtaining, for each type of structural feature from the different types of structural features, a dataset including a plurality of training images that identify the particular structural feature using a bounding box and a plurality of labels corresponding to the training images, wherein each label corresponding to a respective training image indicates whether the identified particular structural feature in the training image meets the one or more accessibility guidelines;
      generating model training outputs based on inputting a subset of the plurality of training images to the accessibility feature detection model; and
      minimizing an objective function of the accessibility feature detection model based on the model training outputs for the subset of the plurality of training images and a corresponding set of labels for the subset of the plurality of training images;
    generating, by the accessibility feature detection model and using the image data, a data output predicting whether the image data includes the particular structural feature meets the one or more accessibility guidelines for the respective type of structural feature, wherein the data output comprises a label indicating: (i) a presence of the particular structural feature in the image data and (ii) compliance of the particular structural feature with the one or more accessibility guidelines;
    generating an accessibility report based on the determination of whether the image data includes the particular structural feature that meets the one or more accessibility guidelines; and
    transmitting, to the client device, the accessibility report for display on the client device.

9. The system of claim 8, wherein execution of the instructions by the one or more data processing apparatus causes performance of operations comprising:
  determining, using an image processing algorithm, data for an attribute relating to the particular structural feature detected in the image data; and
  determining, based on the data for the attribute, whether the particular structural feature meets a second accessibility guideline for the particular structural feature.

10. The system of claim 9, wherein determining whether the particular structural feature meets the second accessibility guideline for the particular structural feature, comprises:
  identifying an accessibility threshold corresponding to the second accessibility guideline;
  when the data for the attribute related to the particular structural feature meets the accessibility threshold, confirming that the particular structural feature meets the second accessibility guideline for the particular structural feature; and
  when the data for the attribute related to the particular structural feature does not meet the accessibility threshold, determining that the particular structural feature does not meet the second accessibility guideline for the particular structural feature.

11. The system of claim 8, further comprising:
  receiving, from the client device, a request to generate the accessibility report for the physical environment; and
  receiving data for an attribute corresponding to one or more structural features corresponding to the physical environment, wherein the one or more structural features includes the particular structural feature.

12. The system of claim 11, wherein receiving data for one or more structural features corresponding to the physical environment, comprises:
  receiving, from the client device, the data for one or more structural features for the physical environment; or
  receiving, from third party data source, the data for one or more structural features for the physical environment.

13. The system of claim 9, wherein generating the accessibility report comprises:
generating the accessibility report using (1) data indicating that the image data includes the particular structural feature, (2) data indicating whether the particular structural feature meets the one or more accessibility guidelines, and (3) recommendation data descriptive of an adjustment or an addition required to the particular structural feature, for compliance with accessibility guidelines for the particular structural feature.

14. The system of claim 9, wherein training the accessibility feature detection model using the set of labeled training images comprises splitting the dataset into a training dataset and a test dataset.

15. A non-transitory computer readable medium storing instructions that, when executed by one or more data processing apparatus, cause the one or more data processing apparatus to perform operations comprising:
receiving, from a client device, input data including image data representing an image of a particular portion of a three-dimensional (3D) physical environment;
inputting, to an accessibility feature detection model, the image data, wherein the accessibility feature detection model is trained to detect different types of structural features and determine, for each type of structural feature, whether a particular structural feature belonging to the respective type of structural feature meets one or more accessibility guidelines for the respective type of structural feature, and wherein the accessibility feature detection model is a trained machine learning model, the training comprising:
  obtaining, for each type of structural feature from the different types of structural features, a dataset including a plurality of training images that identify the particular structural feature using a bounding box and a plurality of labels corresponding to the training images, wherein each label corresponding to a respective training image indicates whether the identified particular structural feature in the training image meets the one or more accessibility guidelines;
  generating model training outputs based on inputting a subset of the plurality of training images to the accessibility feature detection model; and
  minimizing an objective function of the accessibility feature detection model based on the model training outputs for the subset of the plurality of training images and a corresponding set of labels for the subset of the plurality of training images;
generating, by the accessibility feature detection model and using the image data, a data output predicting whether the image data includes the particular structural feature meets the one or more accessibility guidelines for the respective type of structural feature, wherein the data output comprises a label indicating: (i) a presence of the particular structural feature in the image data and (ii) compliance of the particular structural feature with the one or more accessibility guidelines;
generating an accessibility report based on the determination of whether the image data includes the particular structural feature that meets the one or more accessibility guidelines; and
transmitting, to the client device, the accessibility report for display on the client device.

16. The non-transitory computer readable medium of claim 15, wherein the instructions cause the one or more data processing apparatus to perform operations comprising:
determining, using an image processing algorithm, data for an attribute relating to the particular structural feature detected in the image data; and
determining, based on the data for the attribute, whether the particular structural feature meets a second accessibility guideline for the particular structural feature.

17. The non-transitory computer readable medium of claim 15, further comprising:
receiving, from the client device, a request to generate the accessibility report for the physical environment; and
receiving data for an attribute corresponding to one or more structural features corresponding to the physical environment, wherein the one or more structural features includes the particular structural feature, including:
  receiving, from the client device, the data for one or more structural features for the physical environment; or
  receiving, from third party data source, the data for one or more structural features for the physical environment.

18. The computer-implemented method of claim 7, wherein training the accessibility feature detection model using the set of labeled training images comprises evaluating, after training the accessibility feature detection model using the training dataset, model performance using the test dataset by:
obtaining, from the accessibility feature detection model and using images in the test dataset, model predictions corresponding to the images in the test dataset;
computing a model performance metric based on the model predictions obtained for the test dataset; and
in response to determining that the model performance metric does not meet a pre-determined performance threshold for the accessibility feature detection model, updating one or more parameters of the accessibility feature detection model.

19. The computer-implemented method of claim 1, wherein generating the accessibility report comprises:
determining, based on the data output, that the particular structural feature is not complaint with the one or more accessibility guideline;
accessing a database comprising recommendation data descriptive of an adjustment or an addition for the particular structural feature to be compliant with the one or more accessibility guidelines for the particular structural feature; and
generating, based on the recommendation data and by processing visual attributes relating to the particular structural feature detected in the image data, the accessibility report comprising one or more particular adjustments for the particular structural feature to be compliant with the one or more accessibility guidelines.

20. The computer-implemented method of claim 1, wherein the accessibility feature detection model comprises multiple sub-models for detecting and classifying a plurality of structural features, each of the multiple sub-models trained to detect a respective structural feature different than other structural features from the plurality of structural features and to determine whether the respective structural feature meets one or more accessibility guidelines for the respective structural feature.

21. The computer-implemented method of claim 1, wherein the accessibility feature detection model is trained to detect multiple structural features of the 3D physical environment and determine whether a detected instance of a structural feature from the multiple structural features in the image data meets a first accessibility guideline for the structural feature.

\* \* \* \* \*